No. 791,200. PATENTED MAY 30, 1905.
C. O. MICHAELSEN.
CONCENTRATOR.
APPLICATION FILED MAY 26, 1904.

Witnesses:
J W Ball
F. A. Wiswell

Inventor:
Charles O. Michaelsen
By J M Thomas
Attorney.

No. 791,200. PATENTED MAY 30, 1905.
C. O. MICHAELSEN.
CONCENTRATOR.
APPLICATION FILED MAY 26, 1904.

Witnesses:
J. W. Ball
F. A. Wiswell

Inventor:
Charles O. Michaelsen
By J. M. Thomas
Attorney.

No. 791,200. PATENTED MAY 30, 1905.
C. O. MICHAELSEN.
CONCENTRATOR.
APPLICATION FILED MAY 26, 1904.

Witnesses:
J. W. Ball
F. A. Wiswell

Inventor:
Charles O. Michaelsen
By J. M. Thomas
Attorney.

No. 791,200. PATENTED MAY 30, 1905.
C. O. MICHAELSEN.
CONCENTRATOR.
APPLICATION FILED MAY 26, 1904.

Witnesses:
William R. Hall
F. A. Wiswell

Inventor:
Charles O. Michaelsen
By J. M. Thomas
Attorney.

No. 791,200. Patented May 30, 1905.

UNITED STATES PATENT OFFICE.

CHARLES O. MICHAELSEN, OF SALT LAKE CITY, UTAH.

CONCENTRATOR.

SPECIFICATION forming part of Letters Patent No. 791,200, dated May 30, 1905.

Application filed May 26, 1904. Serial No. 209,974.

*To all whom it may concern:*

Be it known that I, CHARLES O. MICHAELSEN, a citizen of the United States, residing at Salt Lake City, Salt Lake county, State of Utah, have invented a new and useful Concentrator, of which the following is a specification.

The invention has for its object to construct the tables in such form and impart such movement to them as will accomplish the best results.

In the several figures illustrating my invention and in each of which similar letters of reference indicate like parts throughout.

Figure 11:
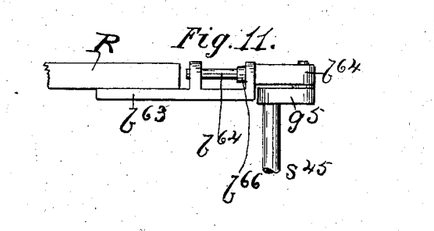
Fig. 11, an enlarged detail of part of articulate G.
Figures 16, 17:
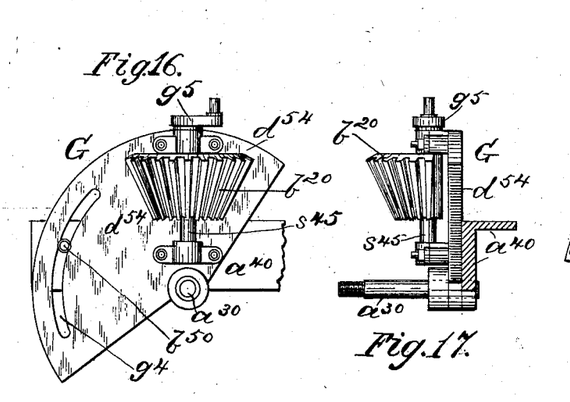
Figs. 16, 17, 18, 19, 20, and 21 are enlarged detail views of one of the articulata G.
Figure 18:
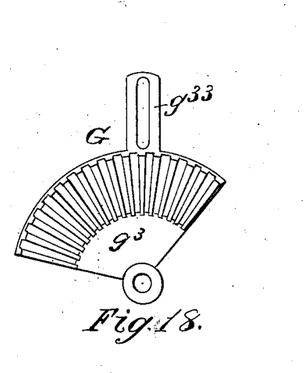
Figure 19:
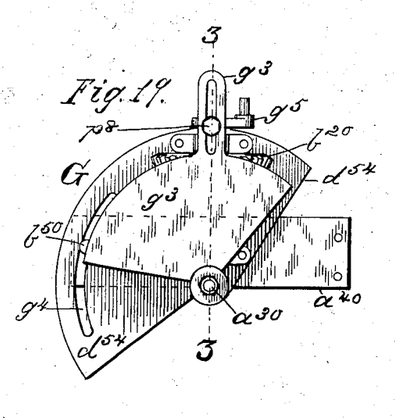
Figure 20:
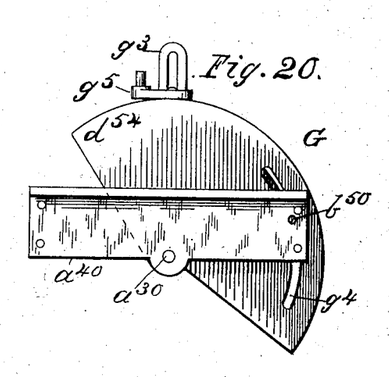
Figure 21:
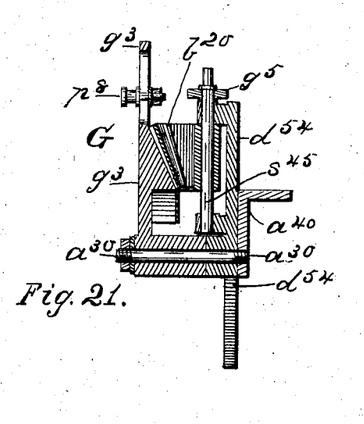

The frame A carries at one end, (which for explanation is hereinafter called "rear" end,) secured thereto, the plate M, which is constructed for and carries journaled therein the driving-shaft H, on which is secured the driving-pulley J, the opposite end of said shaft H having mounted thereon and secured thereto the balance-wheel I. The said shaft H also carries, secured thereto, a pinion $b^{10}$, the teeth of which intermesh with spur gear-wheels $b^6$ and $b^7$. The spur-wheel $b^6$ is mounted on and secured to the upper shaft K, which is also journaled in the plate M. The ends of the said shaft K carry, secured thereto, ordinary eccentrics $a'\ a'$. The spur-wheel $b^7$ is secured to the shaft L, which is equipped in exactly the same manner as is the said shaft K. Each of the eccentrics $a'\ a'$ and $b'\ b'$ is provided with longitudinally-adjustable rods T, whose forward ends are constructed hook form in such manner that working position is maintained on their respective wrist-pins $p^3\ p^3$ and $p^4\ p^4$ by gravity. The said wrist-pins $p^3\ p^3$ and $p^4\ p^4$ are each secured to connecting-bars P and O, respectively, the ends of the connecting-bars P P being suitably connected to adjustable stud wrist-pins $p^8$, one in each slot of the bevel-gear segment-plates $g^3$ of the articulata G, all of which, with the exception of being "rights" and "lefts," are precisely the same in construction and function, (see Figs. 16, 17, 18,) the teeth on the said plates $g^3$ intermeshing with suitable teeth of the bevel-pinion segments $b^{20}$, the hubs of which are secured to short shafts $s^{45}$, each properly journaled in segmented disks $d^{54}$, each pivoted on studs $a^{30}$, Figs. 16, 17, which are firmly secured to angle-plates $a^{40}$. The outer ends of the shafts $s^{45}$ each carry, secured thereto, cranks $g^5$, the crank-pins of which each carry, inclosed thereby, connectors $b^{64}$, Fig. 11, journaled in brackets $b^{63}$ in such a manner as to permit of rotary movement at right angles to the longitudinal axes of each. Each connector $b^{64}$ is provided with a retaining-collar $b^{66}$, pinned or otherwise secured to the cylindrical part of the connectors $b^{64}$ in such manner that will retain the said connectors $b^{64}$ in their proper places.

The connections of the table B and the table C with the articulata G being precisely similar, a description of the connection of one table will serve for both.

Figure 8:
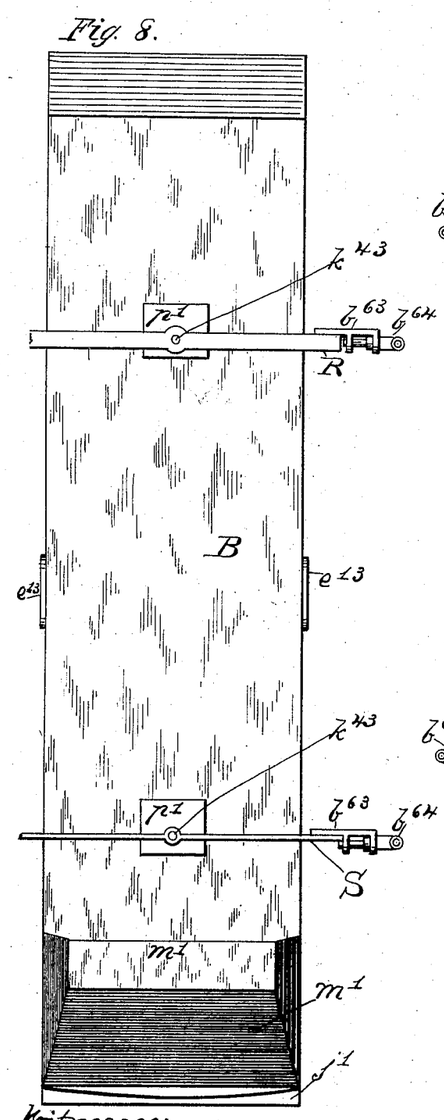
Fig. 8 is an inverted plan view of the upper table B.
Figure 9:
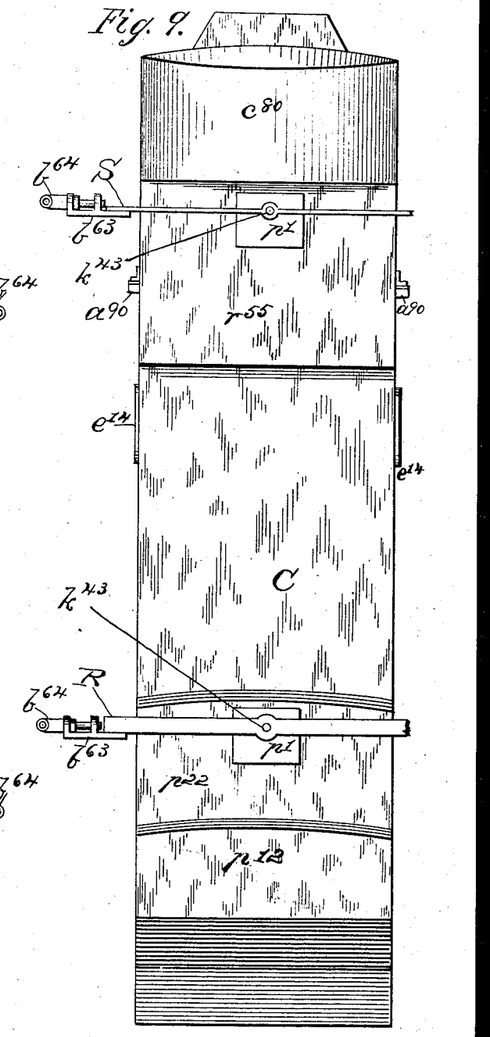
Fig. 9, an inverted plan view of the lower table C.
Figure 10:
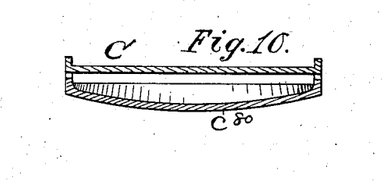
Fig. 10, a transverse section looking in the direction of the arrow, Fig. 6, on line $z\ z$ of Fig. 7 of the lower rear end of the table C.

Referring now to Figs. 8 and 9, to the under side of table B are secured two plates $p'\ p'$, each provided with a projecting pin $k^{43}$, each serving as king-pin to its respective bolster R or S. The bolster R is made thick and inelastic and is pivoted at its middle point with one of the said king-pins $k^{43}$, each extremity of the said bolsters R being firmly secured to a bracket $b^{63}$, hereinbefore described. The bolsters S are similarly connected, but made vertically thin and of suitable elastic material, the purpose of which will hereinafter be more fully set forth.

Figure 1:
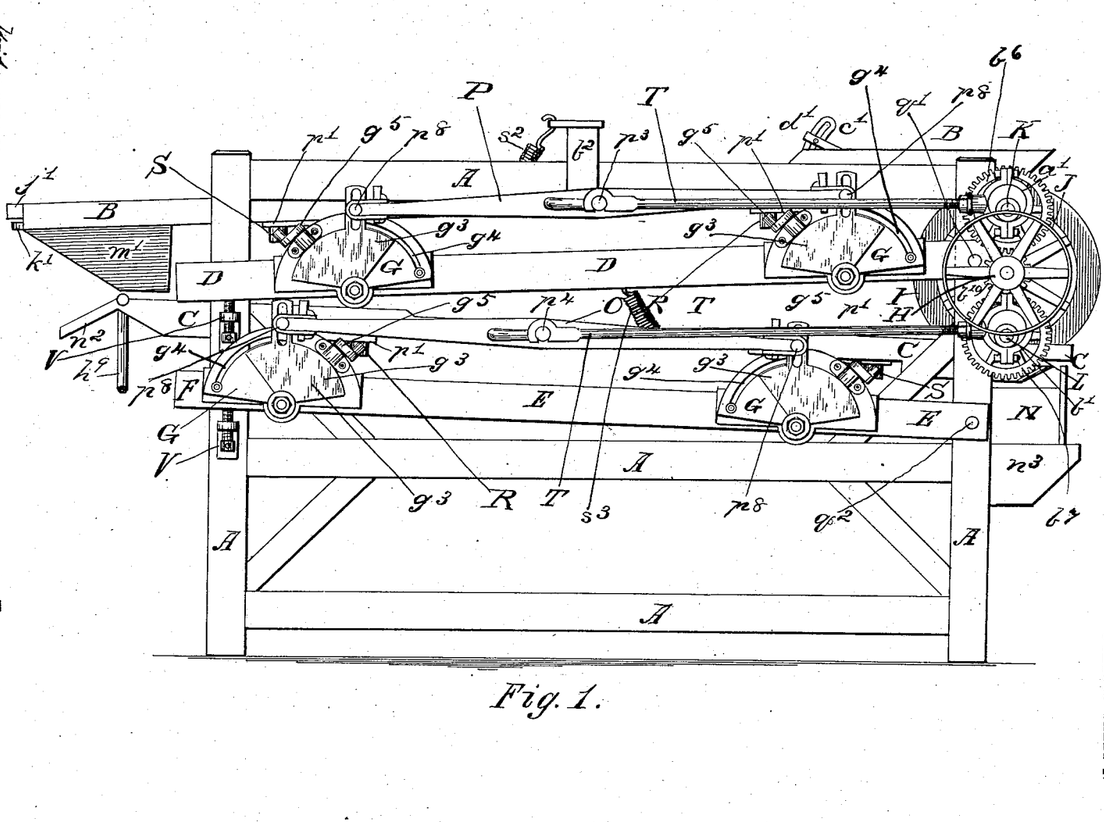
Figure 1 is a side elevation.
Figure 2:
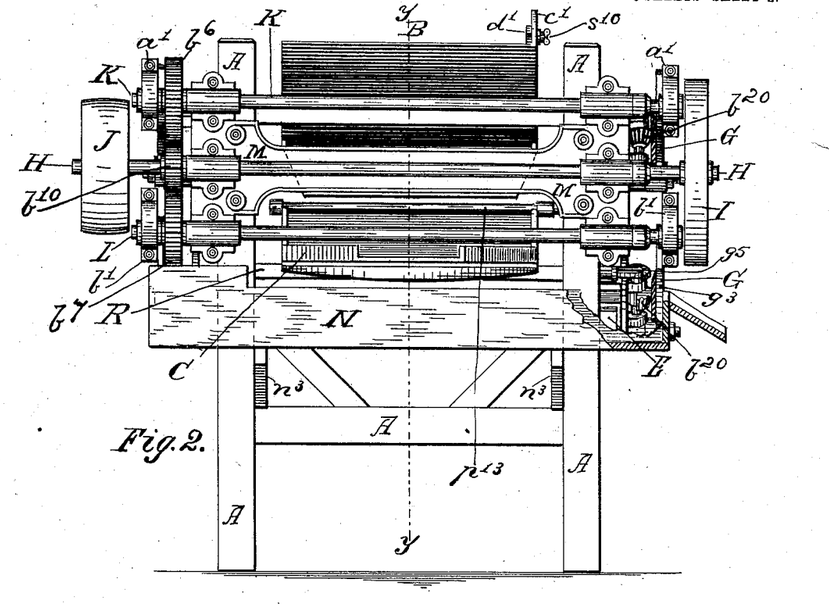
Fig. 2, a rear end elevation.
Figure 3:
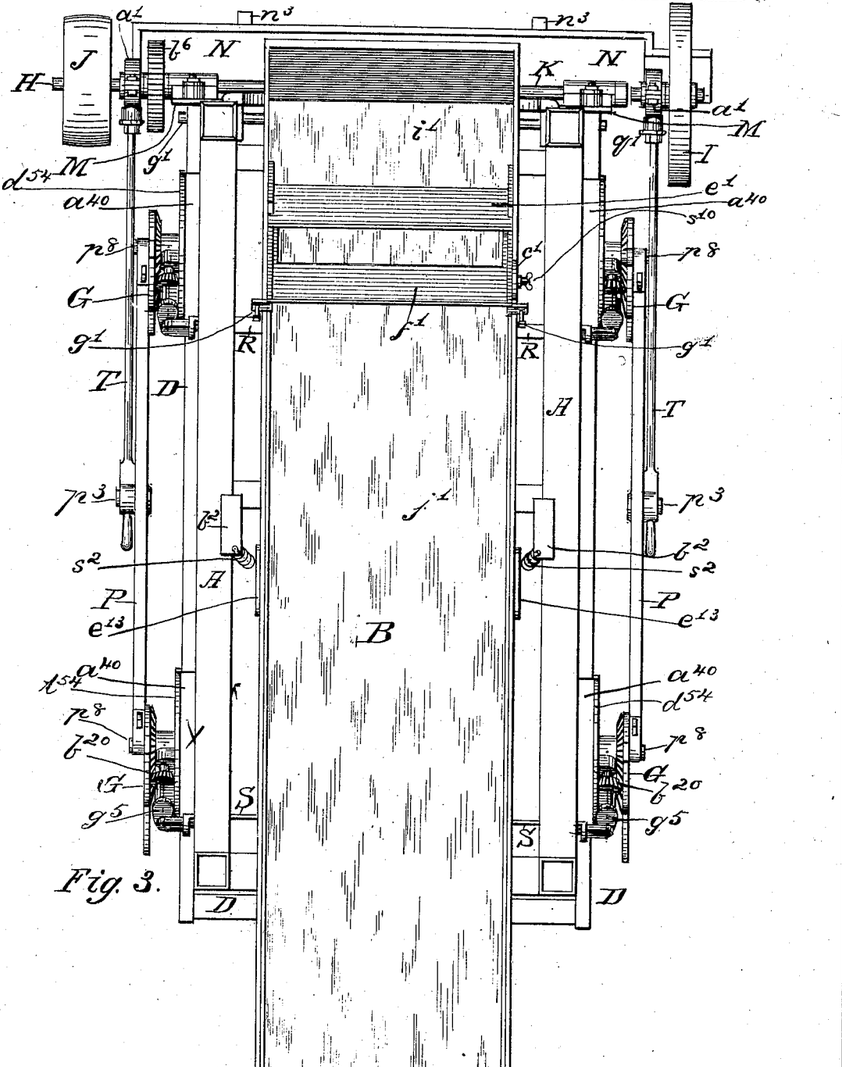
Fig. 3, a plan view.
Figure 4:
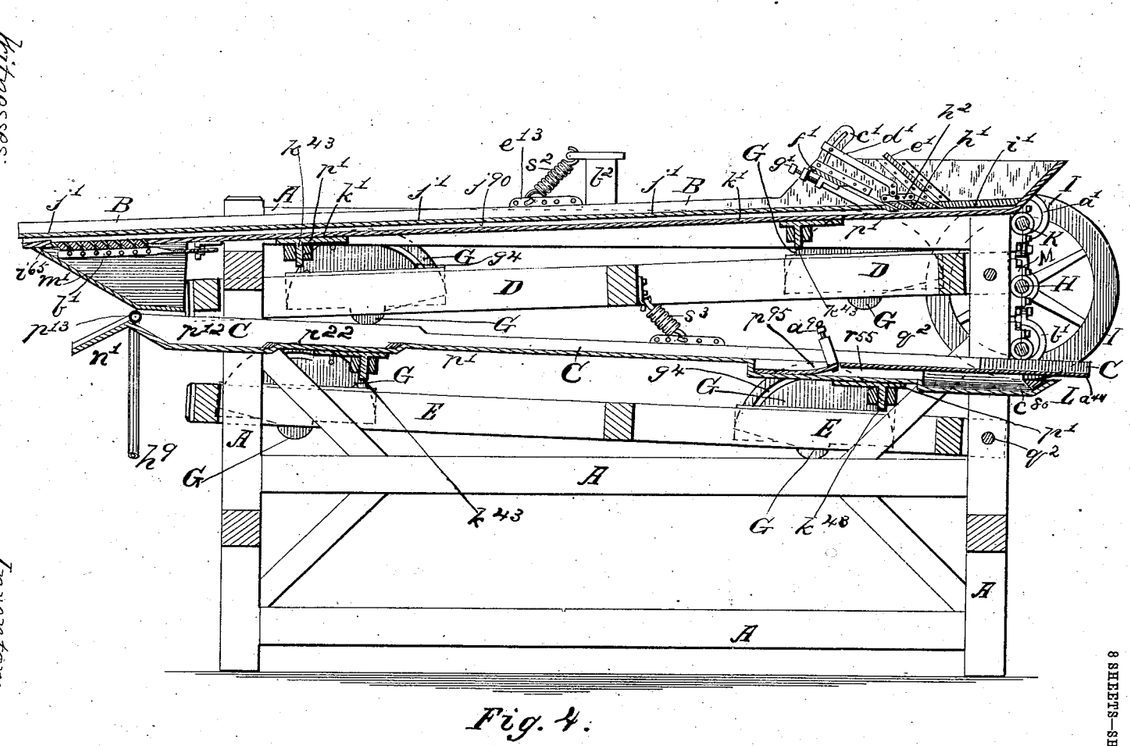
Fig. 4, a vertical longitudinal section on the plane of line $y\ y$, Fig. 2.
Figures 5, 12, 13, 14, 15:
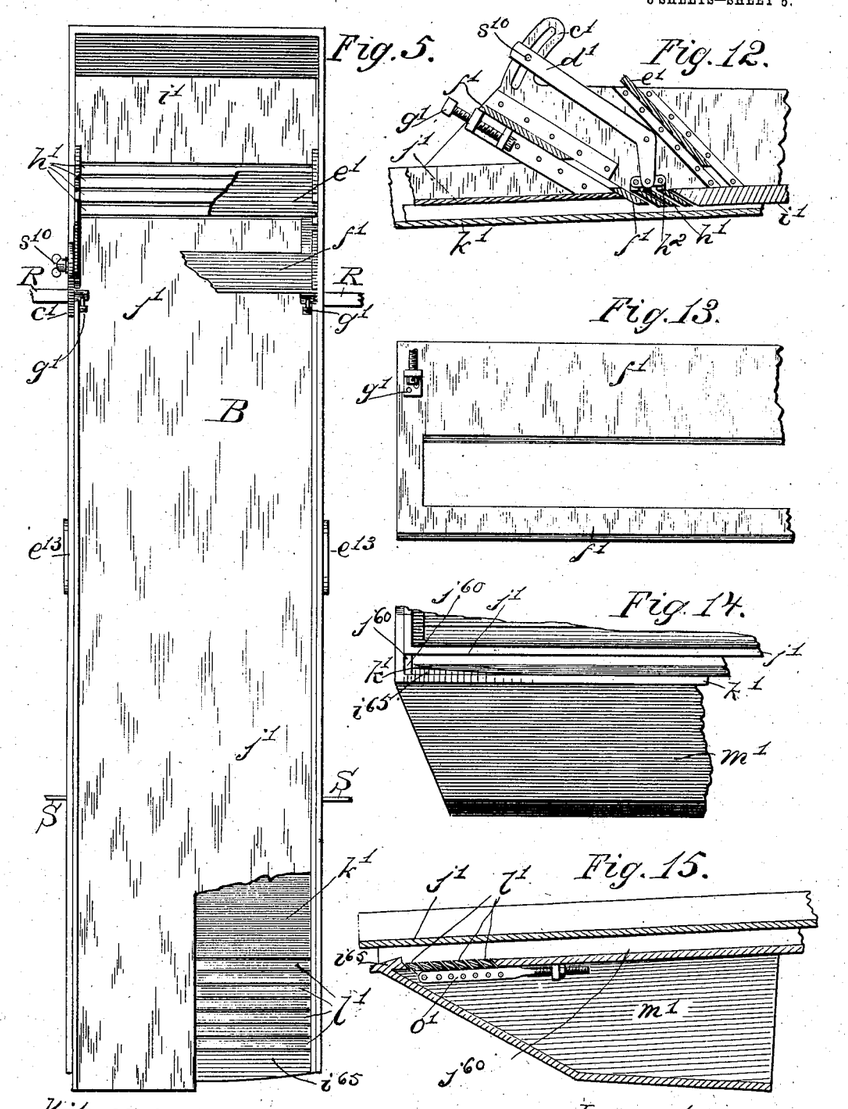
Fig. 5, a plan view of the top of the table B, parts being shown as broken away to show parts of the subtable $k'$.
Fig. 12, an enlarged detail of a section of the top table B.
Figs. 13, 14, 15 are enlarged details of the inverted dam $f'$, front end view of portion of top table B, and section of front end of said table B, respectively.
Figure 6:
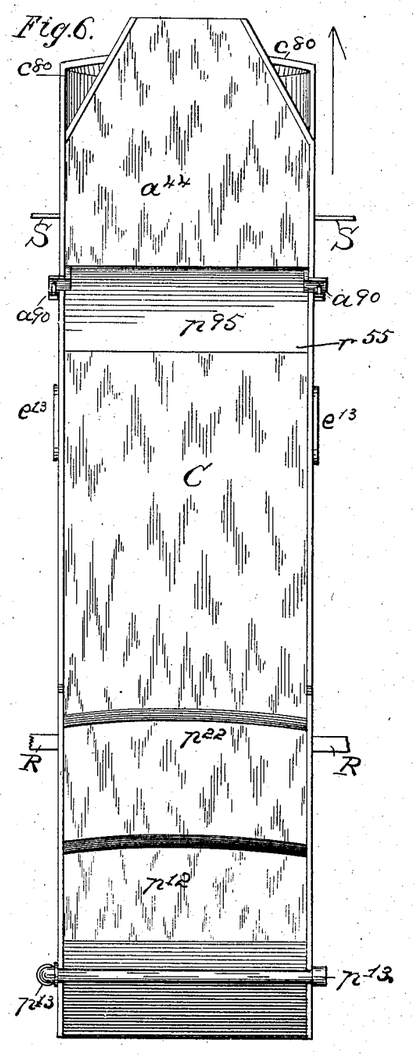
Fig. 6, a plan view of the lower table C.
Figure 7:
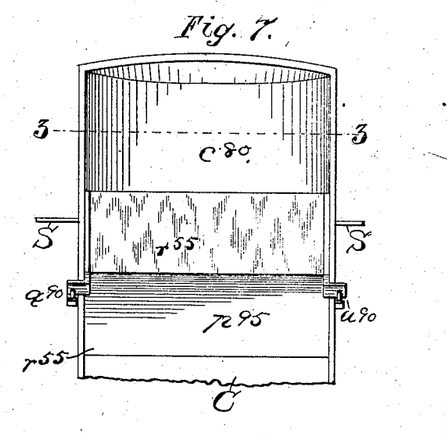
Fig. 7, a detail view showing the lower back end of the lower table C with a part removed to more fully show the concave pan $c^{80}$.

The top table B is provided with two floors, the upper floor $j'$ being removable and maintained at the proper distance from the subfloor $k'$ by the cleats $j'^{60}$, Figs. 14, 15. The upper rear end of the table B is provided with an adjustable gate $e'$, that inclines upwardly toward the front, which, with the opposing inclination of the back of the table B, forms a hopper within which the material for treatment by my invention is first placed. The gate $f'$, Fig. 13, projects below the floor $j'$, but is cut away in such a manner that the lower edge of the opening in the said gate $f'$ can be made, by means of the adjusting-screws $g'$, to serve as a high or low dam. In the floor $j'$ at a point between the two gates $e'$ and $f'$ is a multiple gate $h'$ of several openings, each simultaneously opened or closed when desired by means of a bar $h^2$, connecting all the slats of the said gate $h'$, the said bar $h^2$ being loosely pivoted to a lever $d'$, the upper portion of which carries a stud and thumb-screw $s^{10}$, working in the slot of the arc $c'$ and secured in the desired position by means of the said thumb-screw $s^{10}$. (See Fig. 12.) The said slats composing the said multiple gate $h'$ are pivoted at each end as are window-blind slats, so that each slat may be simultaneously operated to open or close all the slits between each slat at the same time. In the subfloor $k'$, near the forward end and immediately back of the dam $i^{55}$, is a similar multiple gate $l'$, the slats of which are connected to and operated by a bar $o'$, which is reduced to cylindrical form at its rear portion and fitted with thread and nut, (see Fig. 15,) whereby adjustment of the slits in the said gate $l'$ can be made. The under side of the multiple gate $l'$ is inclosed by the box-chute $m'$, (see Figs. 14, 15,) which is contracted at its lower part in the direction of the length of the table B, to which it is secured, the said contraction serving to insure delivery of material from the said chute $m'$ within the sides of the table C.

The table C, like the table B, rests on and is supported by bolsters R S and is provided with successive pockets or pans $p^{12}$ and $p^{22}$, the pan $p^{12}$ being made deeper than the pan $p^{22}$. The discharge part of pan $p^{12}$ is encompassed by a circularly-inclined step or dam whose top is even with the bottom of the pan $p^{22}$, whose discharge part is also bounded by another circularly-inclined step or dam whose top is even with the floor proper of the said table C. At a point farther rearward from the already-described parts of the table C is a depression $r^{55}$, the floor of which is provided with a flexible apron $p^{95}$, serving the purpose of an adjustable gate, adjustment being attained by means of the brackets and adjusting-screws $a^{90}$, the adjustment consisting in raising or lowering the free edge of the said flexible apron $p^{95}$ and correspondingly closing or opening the space between the said free edge of the said flexible apron $p^{95}$ and the adjacent edge of the apron $a^{44}$, which projects over the concave pan $c^{80}$, that terminates the rearmost extremity of the table C. The said apron $a^{44}$ is so constructed that a space exists between its under surface and the floor of the said pan $r^{55}$, as well as between the discharge-rim of the concavity $c^{80}$.

The yokes D and E are each pivoted to the rear posts of the frame A at $q'$ $q'$, $q^2$ $q^2$, respectively, each forward end of the said yokes resting on screw adjusting-brackets V, secured at suitable points on the forward posts of the said frame A. At suitable points on the yokes D and E are secured angle-plates $a^{40}$, each carrying their respective articulata G in the manner hereinbefore described.

The arc-slots $g^4$ in the segment-plates $d^{54}$ afford means of adjusting the angles of the shafts $s^{45}$, a stud-bolt $b^{50}$ within each arc-slot $g^4$ affording means of securing the said plates $d^{54}$ when the desired angle is attained.

Each crank-pin of the cranks $g^5$ enters and imparts its characteristic movement to the connectors $b^{64}$ with which it is connected, and the said connectors $b^{64}$ impart similar motion to the bracket $b^{63}$ of the bolster R or S to which it is articulated, while each bolster R or S being pivoted to its proper king-pin $k^{43}$ the characteristic motion of each said bolsters R or S will be transmitted to that part of the table B or C to which it is connected through the medium of its respective king-pin $k^{43}$. Rocking motion given to the bevel-gear segments $g^3$ by means of adjustable connections in the slots of the projection $g^{33}$, Fig. 18, with the bars O or P will impart similar rocking movement to the teeth interlocking bevel-pinion segments $b^{20}$, thus giving a correspondingly-rocking movement to the cranks $g^5$ in a plane at right angles to the axes of the operating-shafts $s^{45}$ to which any one of the said cranks $g^5$ may be secured.

It will now be seen that by setting the shafts $s^{45}$ with axes perpendicular to the plane of the table B or C the vibratory movement of the said tables B or C would be both longitudinal and lateral and that by setting the axes of shafts $s^{45}$ at an angle to the plane of tables B or C a vertical movement of the said tables B or C would be obtained in addition to the longitudinal and lateral movement of the said tables B or C. It will also be apparent that if it be desired to impart a long movement in any of the possible directions to any one end of either table B or C and a short movement in any of the possible directions to the other end of either of the said tables B or C the rigid inelastic bolsters R will impart their own longitudinal movement to the table B or C to which it is connected, while the elastic bolsters S, possessing a greater or less longitudinal movement than that of the said bolsters R, will be flexed, while at the same time the said elastic bolsters S will impart their respective characteristic lateral and vertical motions to that part of table B or C to which they may be connected. A further adjustment as to degree of arc described by the cranks $g^5$ is obtained by raising or lowering the wrist-pins $p^8$ in the slotted projection $g^{33}$ of any or all the bevel-gear segments $g^3$. Adjustment as to pitch of the tables B and C can be made by raising or lowering the forward ends of the yokes D or E by means of the adjusting screw-brackets V.

At the rear of the machine when desired a box N, resting on brackets $n^3$, may be placed, the said box N serving as a mercury-trap when the nature of the material under treatment requires mercury in the process of selecting.

Power being applied to the driving-pulley J is communicated to shaft H through pinion $b^{10}$ and spur-wheels $b^6$ and $b^7$ to shafts K L, each carrying mounted thereon and secured thereto the eccentrics $a'\ a'$ and $b'\ b'$, respectively, by means of which rectilineal motion is given to the connecting-rods T and by them conveyed to the connecting-bars P O and by them to the articulata G, and so on as hereinbefore described.

In order to relieve the cranks $g^5$ of unnecessary work and weight, the springs $s^2\ s^2$ and $s^3\ s^3$ are provided, the springs $s^2\ s^2$ depending from vertical projections $b^2$ of frame A and each connecting with one of a series of holes in the eye-plates $e^{13}\ e^{13}$, secured to the table B, the springs $s^3\ s^3$ depending from the yoke D and connecting with one of a series of holes in the eye-plates $e^{14}\ e^{14}$ of table C.

Any material consisting of particles of various sizes and of different specific gravity being placed, with a suitable amount of water, in the hopper at the upper rear end of the table B will pass under the gate $e'$ then onto the multiple gate $h'$. Particles too large to pass through the slits of the said multiple gate $h'$ pass over and to waste. The particles that have passed through the slits of the said multiple gate $h'$ gravitate between the floor $j'$ and $k'$ to the multiple gate $l'$ in the subfloor $k'$. The slits of this multiple gate $l'$ are set finer than those of the multiple gate $h'$, and to insure complete separation of the finer from the coarser particles their passage is retarded by a low dam $i^{65}$, the part passing over going to waste. The material that has passed through the multiple gate $l'$ is conducted and delivered, by means of the box-chute $m'$, to the upper front part of the table C into the pan $p^{12}$, where stratification occurs. The lighter particles flowing up the inclined step leading to the pan $p^{22}$ are there again stratified with material at bottom of slightly-less specific gravity than that at bottom in pan $p^{12}$. To assist in carrying away the lighter material, the water-flow is supplemented by the spray-pipe $p^{13}$, perforated with a row of small holes on one side and supplied with water through the hose-pipe $h^9$. The said pipe is so constructed that the spray from it may be permitted to flow upon pan $p^{12}$ or chute $n'$, as desired. From time to time the sublayer of heavy material is scraped out of pan $p^{12}$ over the chute $n'$, when in the same manner the sublayer of material in pan $p^{22}$ is similarly removed. The slimes and still lighter particles of material now flow to the pan $r^{55}$, the bottom forward part of which is provided with a flexible apron $p^{95}$, which partially divides the forward part of the said pan $r^{55}$ from the other part. The slit between the free edge of the said flexible apron $p^{95}$ and the forward edge of the apron $a^{44}$ is adjustable as to width by flexing to a more or less extent the said flexible apron $p^{95}$ by means of the perpendicular extensions of the same fitted with adjusting-screws $a^{90}$. The material finally flowing over the slit at the end of the said flexible apron $p^{95}$ goes to waste, while that which passes through flows to the concave pan $c^{80}$, within which, if desired, mercury may be placed to more efficiently secure the selection and conservation of the values, in which case the box N to serve as a mercury-trap may be used.

I claim—

1. A double-floored concentrating-table adapted to oscillate in any direction and consisting of longitudinally-inclined upper and lower floors within upwardly-projecting sides, with space between the said two floors, the upper floor provided at its upper end with adjustable transverse openings communicating with the said lower floor which is also provided with adjustable transverse openings at its lower end communicating with a box-chute for conveying water and pulp to a lower table located under the said double table, the said lower table inclining in the opposite direction from the pitch of the said double table which is actuated by means of the two bolsters, pivoted to the said table at points midway of its longitudinal direction, the said bolsters being pivoted at each of their ends to pins of cranks forming part of the articulata, in such manner that when the articulata are adjusted and operated by suitable means, the desired movement will be imparted to the said bolsters, and through them to the said table, each of the said tables being independently adjustable as to inclination by means substantially as shown.

2. A concentrating-table adapted to oscillate in any direction and consisting of a floor longitudinally bounded by upwardly-projecting sides, the said floor being provided with a number of depressions, the first of the said depressions being deeper than the second, which is deeper than the floor proper of the said table, and another depression, lower down the incline of the said table, provided with an adjustable gate for still further grading the concentrates already formed, with a terminal longitudinally-concave depression, covered by the said floor proper of the said lower table which is actuated by means of the two bolsters, pivoted to the said table at points midway of its longitudinal direction, the said bolsters being pivoted at each of their ends to pins of cranks forming part of the articulata, in such manner that when the articulata are adjusted and operated by suitable means, the desired movement will be imparted to the said bolsters and through them to the said table, all acting as and for the purpose set forth.

3. The double-floored concentrating-table centrally pivoted at two points to two actuating-bolsters, each pivoted midway of its length to the said double-floored table at points near the ends of said tables, said bolsters being pivoted at each of their ends to pins of cranks forming part of the articulata, in such manner that when the articulata are adjusted and operated by suitable means, the desired movement will be imparted to the said bolsters and through them to the said table; each of the said bolsters being adjustable independently of the other, one of the said bolsters being flexible, the other being non-elastic, for the purposes substantially as shown.

4. A concentrating-table centrally pivoted at two points, one toward the upper end and one toward the lower end, to actuating-bolsters, one flexible and the other non-elastic and each pivoted at their respective ends to crank-pins of the crank-forming parts of each connected articulate, one of which may be adjusted so as to give its crank and pin more lateral throw and less vertical movement than the other said articulate; the non-elastic bolster imparting to that end of its connected table the exact movement given by the said connecting crank-pins; the flexible bolster giving to that end of the said table the lateral and vertical movement of its connecting crank-pin but not affecting the longitudinal movement thereof, for the purpose substantially as shown.

5. In combination with a concentrating-table adapted to simultaneously move in a variety of directions, a non-elastic bolster centrally pivoted to the under side of the said table at a suitable point between the middle of the said table and its end, the said bolster carrying at each end a bracket secured thereto, within which are pivoted connectors which, at their outer extremities, are pivoted to crank-pins of cranks secured to rock-shafts forming part of the articulata, having segment-plates and wrist-pins, means for producing rectilinear, lateral, and vertical movement; means for adjusting the angle of one or more connected pairs of said rock-shafts; and means to adjust the wrist-pin on the segment-plates to vary the movement.

6. The combination of a non-elastic cross-bar pivoted at a suitable point to a concentrating-table, the said cross-bar carrying, secured thereto or integral therewith, brackets into which are pivoted, with means for preventing end play, of devices for connecting the crank-pins of the adjustably-inclined shafts of the articulata with the said non-elastic cross-bar, the said inclined shafts being journaled in bearings secured to or forming part of a segment-plate adjustably secured to a base angle-plate, bolted to an adjustably-inclined yoke pivoted at one end to the frame of the machine, the said inclined shafts carrying secured thereto, the segments of toothed bevel-pinions deriving motion from toothed segment-plates made to describe an arc of movement on studs secured to the said base angle-plates, the said arc of movement being determined by the distance from the said studs of adjustably-secured wrist-pins in slotted projections of the said segment-plates; the said wrist-pins being inclosed and actuated by the forward ends of connecting-bars, whose other extremities are secured to similar articulata, the said connecting-bars being actuated through suitable wrist-pins secured to the said connecting-bars, the said wrist-pins being detachably connected to the forward ends of connecting-rods whose other ends are adjustably secured to eccentric straps, enveloping the peripheries of eccentrics mounted on and secured to a shaft journaled in bearings suitably secured to the frame of the machine, the said shaft deriving motion from a pinion, whose teeth engage with teeth of a spur-wheel mounted on and secured to a suitably journaled and driven shaft, all acting in conjunction to produce the movements, substantially as described.

7. In combination with a concentrating-table adapted to simultaneously move in a variety of directions, a non-elastic and an elastic bolster centrally pivoted to the under side of the said table at suitable points between the middle of the said table and its ends, the said bolsters carrying at each end a bracket secured thereto, within which are pivoted connectors which at their outer extremities are pivoted to crank-pins of cranks secured to rock-shafts forming part of the articulata, through which, motion is adjustably transformed from rectilinear to lateral, vertical, or horizontal movement, in the manner, by the means, and for the purpose, substantially as described.

8. The combination of an elastic cross-bar pivoted at a suitable point to a concentrating-table, the said cross-bar carrying, secured thereto, brackets into which are pivoted, connectors for connecting the crank-pins of the adjustably-inclined rock-shafts of the articulata with the said elastic cross-bar, the said inclined shafts being journaled in bearings secured to or forming part of a segment-plate adjustably secured to a base angle-plate bolted to an adjustably-inclined yoke pivoted at one end to the frame of the machine, the said inclined shafts carrying secured thereto, the segments of toothed bevel-pinions, deriving motion from toothed segment-plates made to describe an arc of movement on studs secured to the said base angle-plates, the said arc of movement being determined by the distance from the said studs of adjustably-secured wrist-pins in slotted projections of the said segment-plates; the said wrist-pins being inclosed and actuated by the forward ends of connecting-bars, whose other extremities are secured to similar articulata, the said connecting-bars being actuated through suitable wrist-pins secured to the said connecting-bars, the said wrist-pins being detachably connected to the forward ends of connecting-rods whose other ends are adjustably secured to eccentric-straps, enveloping the peripheries of eccentrics mounted on and secured to a shaft journaled in bearings suitably secured to the frame of the machine, the said shaft deriving motion from a pinion, whose teeth engage with teeth of a spur-wheel mounted on and secured to a suitably journaled and driven shaft, all acting in conjunction to produce the movements, substantially as described.

9. The device for converting arbitrary longitudinally-rectilinear motion into adjustable oscillatory movement in any direction, consisting of a base angle-plate secured to an adjustably-inclined yoke, the said base angle-plate carrying secured to, and horizontally projecting therefrom, in a direction at right angles to the longitudinal axis of the whole, a stud which serves as the axis for an adjustably-secured segment-plate, adjustment of which is obtained in a plane at right angles to the said stud and securely retained by means of a bolt projecting through a slotted arc in the said segment-plate into the said base angle-plate, the said segment-plate carrying journaled thereto a short shaft whose axial line is radial with the axis of the said stud, the said short shaft having secured thereto the segment of a bevel-pinion, the outer end of the said short shaft carrying secured thereto a crank provided with a crank-pin; the teeth of the said bevel-pinion engaging with teeth of an outer segment-plate provided with a slotted projection carrying an adjustable wrist-pin stud by which a rocking movement is acquired from a suitably-actuated connecting-bar, the said outer segment-plate being pivoted on the said stud, and maintained in proper mesh with the said bevel-pinion segment by suitable means; the said crank and wrist pin imparting its characteristic motion to a connecting cross-bar whose other extremity is similarly connected to a conversely-moving device of the same character, the said cross-bar being suitably pivoted to a table, correspondingly actuating the same, substantially as described.

CHARLES O. MICHAELSEN.

Witnesses:
F. A. WISWELL,
M. L. CUMMINGS.